Patented July 2, 1940

2,206,187

UNITED STATES PATENT OFFICE 2,206,187

METHOD OF INCREASING PRODUCTION OF OIL WELLS

Abraham M. Herbsman, Huntington Park, Calif., assignor to Industrial Patents, Limited, Huntington Park, Calif., a corporation of California No Drawing. Application June 19, 1937, Serial No. 149,176

3 Claims. (Cl. 166—21)

This invention relates to the art of petroleum production and has particularly to do with relieving petroleum wells from conditions which tend to frustrate the flow of oil into and from the well, and thereby increasing the productivity of the well.

A condition is commonly met with in oil wells, in which carbonates or other inorganic deposits collect along the walls of the well itself or on the surfaces of the well casing, pump tubing or pumping apparatus, which deposits restrict the seepage of oil into the well and the flow of oil through the apparatus for pumping it from the well. One method previously devised for eliminating these deposits has been the introduction into the well of an aqueous solution of hydrochloric acid, which acid attacks the deposits of carbonate, causing these to be dissolved and carried away by the oil coming into and being pumped from the well. This method proved to be destructive of the metal equipment in the well, as the aqueous solution of hydrochloric acid used attacked this metal equipment.

In the attempt to eliminate the inorganic and carbonate deposits, etc., without damaging the metal in the well, the hydrochloric acid method was modified by adding to the acid a so-called inhibitor or chemical for the purpose of retarding chemical activity between the acid and the metal in the well which the acid contacted in its course to the limestone deposits, etc. to be treated.

In many cases, however, it has been found that the mixture of an aqueous solution of the acid and the so-called inhibitor has practically the same effect on the metal contacted as the acid without the inhibitor.

It is an object of this invention to provide a novel method of increasing the production of oil wells where the flow of oil has been obstructed by inorganic deposits such as carbonates or the like, without substantially affecting the metal equipment in the well.

It is a further object of my invention to provide a novel method of introducing an acid, such as hydrochloric acid, into an oil well without substantially affecting the metal equipment in said well.

The method of my invention embraces broadly the preparation of the acid to be introduced under pressure into the well in such a manner that the acid is insulated from the metal in the well and thereby prevented from reacting on this metal. In my experiments I found that hydrochloric acid gas absorbed in a liquid, which is practically immiscible with or insoluble in water, does not affect to any appreciable extent the metal equipment of the well into which said liquid is introduced.

In practising the method of my invention, the water immiscible liquid used for absorbing the hydrochloric acid gas is preferably a mineral oil or a derivative of a mineral oil.

In some instances where the method of my invention is practiced, it is advisable to remove any water that may adhere to the metal in the well, before the introduction of the acid gas mixture. In such cases, I have found it expedient and satisfactory to give a preliminary treatment to the surfaces of said metal with a reagent which emulsifies the adherent water, so as to produce a water in oil emulsion therewith. The reagent which I preferably use for this purpose is composed of one part of magnesium oleate in solution with 95 parts of a mineral oil and 5 parts of acetone.

After the acid gas mixture has been introduced into the well and has reached the carbonate strata or the like to be treated, it is sometimes found desirable to inject water into the well so that this will come into contact with the inorganic or carbonate deposit being treated and with the acid gas mixture already delivered to that strata. This added step in my method is frequently useful where the reagent used is hydrochloric acid gas absorbed into a water immiscible liquid and where there is no water present in the strata being treated.

What I claim is:

1. The method of increasing the production of a well wherein inorganic deposits in and adjacent the well restrict the flow of oil which comprises introducing a solution of hydrochloric acid gas absorbed in a liquid which is immiscible with water into the well.

2. The method of increasing the production of a well wherein inorganic deposits in and adjacent the well restrict the flow of oil which comprises introducing a solution of hydrochloric acid gas absorbed in a liquid which is immiscible with water into the well, and subsequently introducing water into the well.

3. The method of increasing the production of a well wherein inorganic deposits in and adjacent the well restrict the flow of oil which comprises introducing a reagent capable of emulsifying water adhering to metal parts of the well into the well, introducing a solution of hydrochloric acid gas absorbed in a liquid which is immiscible with water into the well, and subsequently introducing water into the well.

ABRAHAM M. HERBSMAN.